Figure 1:
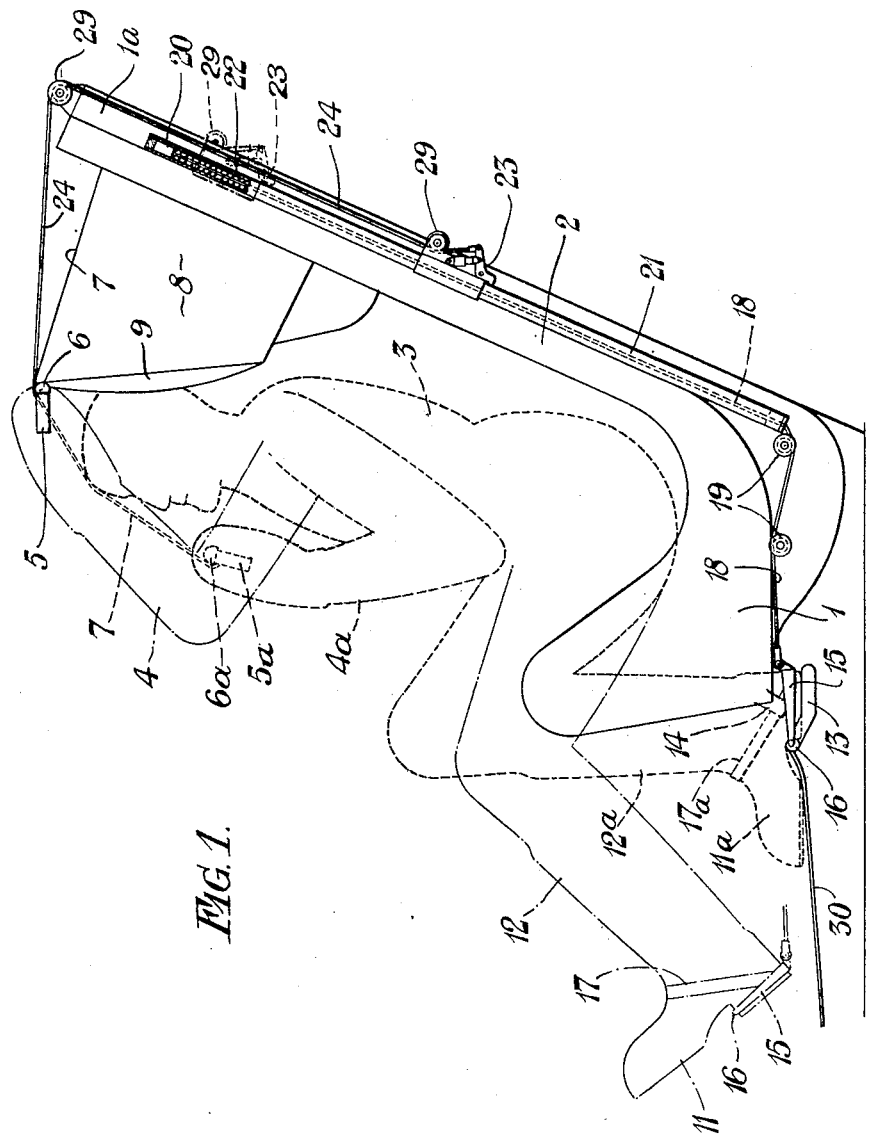

Nov. 7, 1950  J. MARTIN  2,528,532
BODY POSITIONING MEANS FOR AIRCRAFT EJECTION SEATS
Filed May 27, 1947  4 Sheets-Sheet 1

INVENTOR
JAMES MARTIN
per Worth Wade
ATTORNEY

Nov. 7, 1950  J. MARTIN  2,528,532
BODY POSITIONING MEANS FOR AIRCRAFT EJECTION SEATS
Filed May 27, 1947  4 Sheets-Sheet 2

INVENTOR.
JAMES MARTIN
per Worth Wade
ATTORNEY.

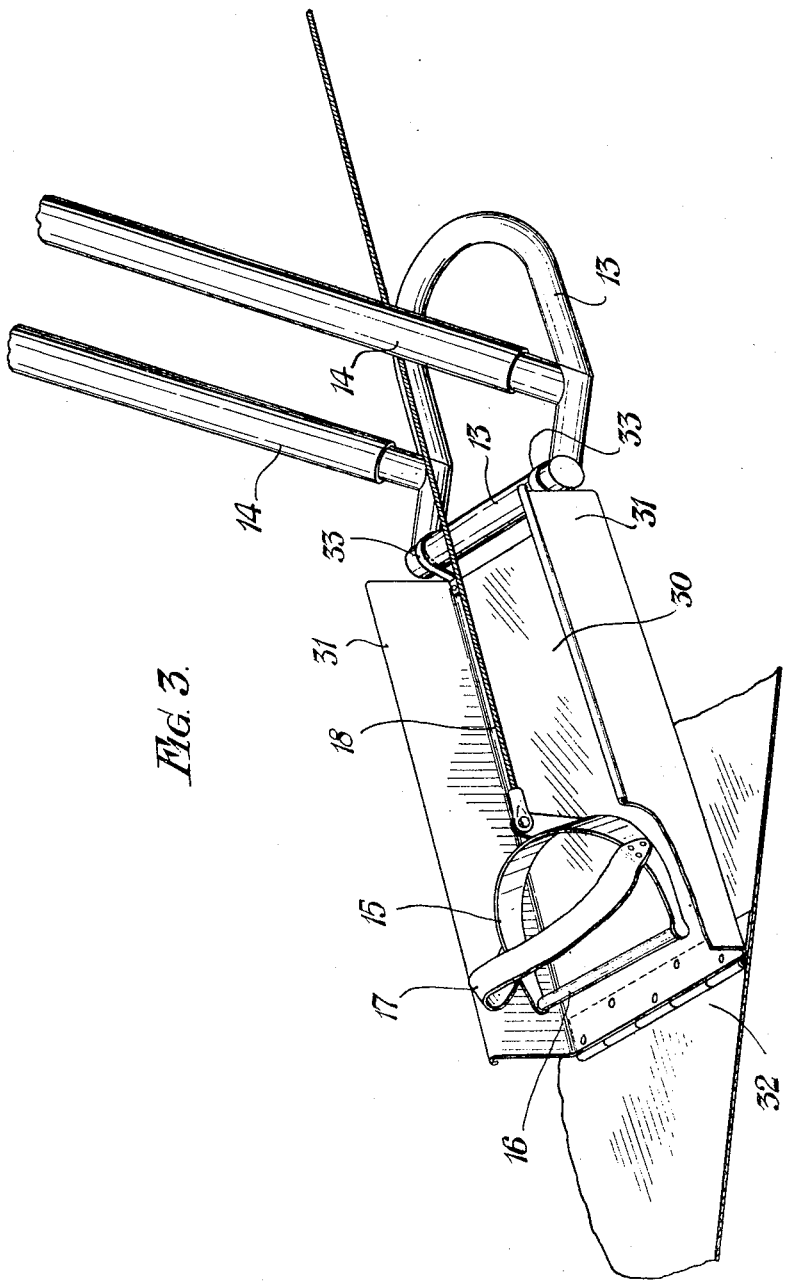

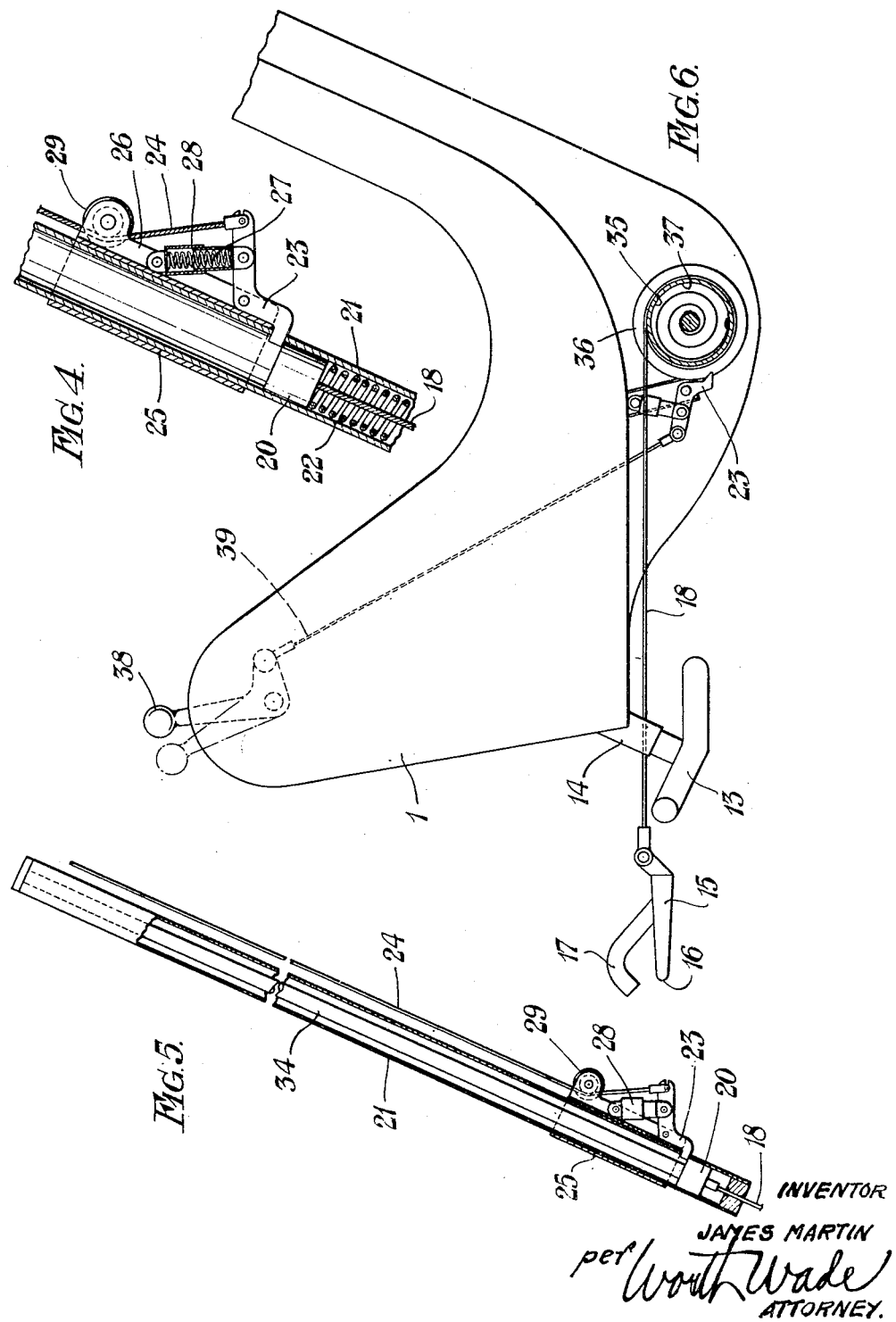

Patented Nov. 7, 1950

2,528,532

UNITED STATES PATENT OFFICE 2,528,532

BODY POSITIONING MEANS FOR AIRCRAFT EJECTION SEATS

James Martin, Higher Denham, near Uxbridge, England

Application May 27, 1947, Serial No. 750,856
In Great Britain June 7, 1946

7 Claims. (Cl. 244—122)

In launching a pilot or other occupant from an aeroplane in flight by means of controlled but forcible ejection from the aeroplane, it is highly desirable or may even be necessary to ensure that the limbs of the pilot or other occupant are correctly positioned when the launching operation takes place and this is especially so if the aeroplane is in an inverted or abnormal position.

According to this invention the hands and arms are positioned by the act of releasing or setting in operation of the launching means and suitable foot rests are provided to position the feet and means for ensuring that the feet will be automatically brought into position and supported on the foot rests are provided for this purpose. The invention is particularly suitable for use with the apparatus described in connection with the ejection seat described in my co-pending application U. S. Serial No. 638,762, filed January 3, 1946, now Patent No. 2,467,763, issued April 19, 1949.

In one arrangement apparatus for launching a pilot or other occupant from an aeroplane in flight is provided with one or more foot rests to receive and position the feet and legs of the pilot or other occupant and means is also provided to ensure the correct positioning of the feet on the foot rests during the launching operation which is performed by the pilot or other occupant drawing a protective cover over his face thereby locating his hands and arms in a position of safety and also setting the launching mechanism in operation.

In carrying the invention into practice, foot rests may be provided at each side of the seat frame to be launched with the occupant and suitable attachments are provided for connection with the occupant's foot wear, and cables or other flexible connections connect the attachments to the seat so that operating mechanism thereon will automatically draw the occupant's feet correctly into position on the foot rests when the launching mechanism is released or brought into operation. In this connection a spring loaded plunger mounted in a tubular or other guide in the seat frame may be connected by flexible cables passing over suitable guides and connected to stirrups or stirrup-shaped loops fitted to or in which the occupant's footwear engage. A trigger device may be provided to release the plunger by the act of setting or releasing the launching mechanism which is in turn effected by the act of drawing a protective cover over the occupant's face. The spring acting on the plunger then acts on the cable which pulls back the stirrup fittings to draw the feet into position on the foot rests. This ensures that the feet and legs will be correctly positioned to avoid damage or injury to the occupant whilst being ejected from the aeroplane.

Figure 2:
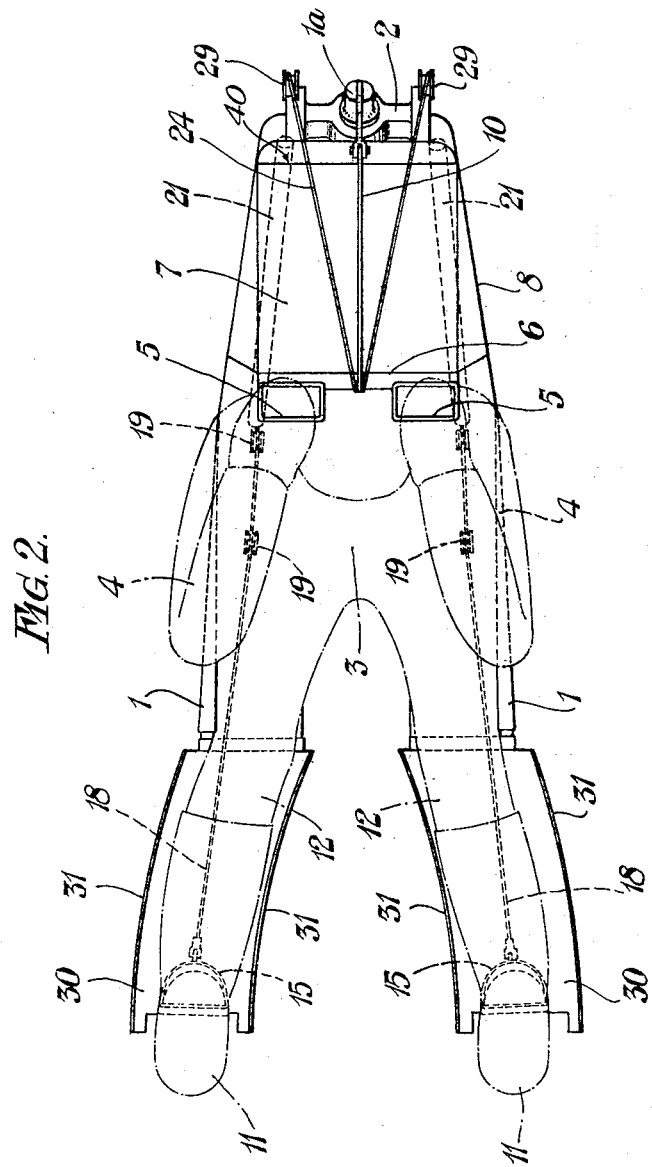

The invention will now be described with reference to the accompanying drawings in which:

Fig. 1 is a diagrammatic side elevation of a pilot or other occupant of an aeroplane seated in an ejection seat, Fig. 2 is a plan view of Fig. 1, Fig. 3 is a fragmentary perspective view showing the means for drawing one of the occupant's feet onto a foot rest on the ejection seat, Fig. 4 is a sectional detail showing a spring plunger and control catch for actuating the foot positioning means, Fig. 5 is a part sectional elevation showing a plunger and tension spring actuating device and control catch for the foot positioning means arranged in a tubular housing for mounting in the back of an ejection seat, and Fig. 6 is a side elevation of the lower part of an ejection seat to a larger scale than Fig. 1 and showing a foot rest and a foot stirrup connected by a cable to a modified form of coiled spring actuating device.

Referring to the drawings the ejection seat shown in Figs. 1 and 2 may be of the type described in my co-pending application, Ser. No. 638,762 above described. The ejection seat 1 is mounted on guides directed toward an opening in the aeroplane through which it may be launched. Arranged in the seat back is an impeller unit adapted to act between the seat and a fixed part of the aeroplane and to be supplied with pressure fluid to eject the seat and occupant from an aeroplane. In the example shown in Figs. 1 and 2 and described and illustrated in my above-mentioned application the guides and impeller unit are located within the seat back 2 of the ejection seat 1 and the seat is arranged to be ejected in an upward direction along the inclined line of the seat back 2. Figs. 1 and 2 show a pilot 3 in the seat 1 and the dot and dash lines show the position of his limbs at the moment when he is about to bring into operation the impeller mechanism to eject the seat and himself from the aeroplane. In this position his arms 4 are raised to grasp the handles 5 on a cross bar 6 on the forward edge of a protective cover 7 adapted to be drawn out of the compartment 8 through the slit 40 (see Fig. 2) into position in front of and over his face to protect his eyes, nose and mouth against the pressure of the air which he will meet when launched from the aeroplane. The pilot's parachute may be folded in the compartment 8 on the seat back 2 and will be suitably connected with the harness worn on his person. The front of the compartment 8 has a padded head rest 9 against which the pilot's head may rest during the launching operation in order to prevent his neck being broken or injured by the air pressure which he will meet on emerging from the aeroplane and the protective cover 7 when drawn down over his face will tend to hold his head against the head rest 9.

The dotted lines show the position of the pilot's limbs after he has drawn the protective cover 7 into position over his face, which act also sets in operation the mechanism of the impeller unit 1a mounted on the back of the seat. This is effected by a cable 10 connected from the cross bar 6 to the control mechanism of the impeller unit in the seat back 2. In this position the pilot's arms 4 are brought into a position tucked compactly against his body and therefore protected against risk of injury by striking against any part of the aeroplane as the seat and its occupant is launched therefrom. The pilot's feet 11 and legs 12 which normally occupy the position indicated by dot and dash lines of Figs. 1 and 2 are automatically drawn back to the position indicated by the dotted lines and the numerals 11a and 12a in Fig. 1 and his feet may be positioned on the foot rests 13 arranged one at each side of the front of the seat 1. These foot rests 13 may be adjustably supported by telescopic supports 14 from the frame of the seat 1 (see particularly Fig. 3).

The pilot's feet 11 and legs 12 are automatically drawn back until his feet 11a are supported on the foot rests 13 and the legs 12a are folded compactly so as to pass safely through the opening in the aeroplane when the seat and occupant are launched therefrom. In this position the legs and body occupy a position in which the legs and chief organs of the body are protected against the effect of rapid ejection and the air pressure which will be met as the occupant of the seat emerges from the aeroplane. The positioning of the feet of the pilot or other occupant is effected by stirrups 15 which embrace the heel of his boot and have a cross bar 16 which extends across the front thereof and a retaining flexible band 17 which extends over the wearer's instep. These stirrups 15 are each connected by flexible cables 18 running over pulleys 19 supported by the seat 1 to the plunger 20 slidably mounted in a tubular housing 21 supported in the seat back 2. Within the tubular housing 21 is a compression spring 22 adapted to be compressed between the plunger 20 and the lower end of the tubular housing 21 when the stirrup 15 and cable 18 is drawn out to a position to allow reasonably free movement of the feet and legs under normal conditions and particularly to allow normal operation of the rudder bar by the pilot when applied to his feet. Each plunger 20 is drawn down in its tubular housing 21 until it is engaged and retained by the locking catch 23 which is in turn connected by flexible release cable 24 to the cross bar 6 on the forward edge of the protective face cover 7. In this position the springs 22 are retained in the compressed condition ready to pull upon the cables 15 to draw the feet of the occupant of the seat onto the foot rests 13.

A suitable construction of locking catch 23 is shown in the enlarged sectional detail (Fig. 4) of part of the tubular housing 21. Around the tubular housing 23 is fitted a tubular sheath 25 having a bracket 26 to which is pivoted the locking catch 23 in the form of a lever, one end of which projects through an opening in the tubular housing 21 into the path of the plunger 20, to retain it against the action of the compressed spring 22. The locking catch 23 is held in the retaining position by a spring 27 in a telescopic sheath 28. A flexible release cable 24 extends from the end of each locking catch 23 round guiding pulleys 29 to the cross bar 6 of the protective face cover 7. Thus when the protective cover is drawn over the face of the occupant of the seat, a pull will be exerted on the cables 24 to withdraw the locking catches 23 thereby releasing the plungers 20 which are forced upwardly in the tubular housings 21 and pull upon the cables 15 to draw the feet of the occupant of the seat onto the foot rests 13. When the hands draw down the rod 6 the cable 24 causes the catch 23 to be withdrawn and this permits the sheath 25 to slide upward on the tubular housing 21, thus permitting the rod 6 to be drawn down over the face of the occupant to the position indicated by broken lines and reference numeral 6a in Fig. 1.

In order to assist in guiding the feet of the occupant of the seat onto the foot rests 13, guide plates 30 (see Figs. 1, 2 and 3) are provided in front of the foot rests 13 and extending forward beneath the most forward position of the feet. In Fig. 2 these guide plates 30 are curved inwardly so as to bring the occupant's feet and legs nearer together. In Fig. 3 the guide plates 30 are shown of channel form with side walls 31. The front ends of the guide plates 31 may be hinged to the floor 32 of the aeroplane as shown in Fig. 3 and the rear ends may be provided with clips 33 to connect them to the foot rests 13. These clips may be readily separable or weak so as to tear away when the seat is ejected from the aeroplane. Alternatively the forward ends of the guide plates may rest loosely on the floor of the aeroplane and the rear ends may be hinged to the foot rests by the clips 33. The length of the cables 24 and 10 is sufficient to permit the protective cover 7 to be drawn into place whilst also ensuring the release of the actuating mechanism of the impeller unit of the seat and the spring controlled plungers for positioning the feet of its occupant.

In Fig. 5 is shown an alternative form of actuating mechanism for positioning the feet of the occupant of the seat in which a tension form of spring member 34 is used in place of the compression spring 22.

In Fig. 6 is shown a still further form of coil spring 35 with the locking catch 23 acting on a flange 36 on the enclosing case 37 of the coil spring 35. In this arrangement a hand control lever 38 and cable 39 are provided for releasing the locking catch 23.

Although the specification refers frequently to the "pilot" it is to be understood that this term where suitable also includes any other occupant of an ejection seat for launching from an aeroplane.

When the occupant of an ejection seat has decided to make a parachute escape from the aeroplane, all that he has to do is to uncover the opening to the escape hatch and pull down the protective cover 7 over his face. This brings his hands and arms into a safe position close to his body and also releases the locking catches 23 so that his feet will also be brought into a safe position on the foot rests 13 and his legs will occupy a compactly folded position enabling his body to withstand the effects of rapid ejection from the aeroplane and the force of the air pressure which he will encounter as he emerges therefrom. He is thereby relieved of the necessity of remembering to take a number of detail precautions at a time of emergency. The act of pulling down the protective cover also actuates the mechanism to launch the seat and its occupant from the aeroplane.

I claim:

1. In an ejection seat for launching a person from an aircraft, the combination of, a seat having a head rest and a foot rest for each foot of the occupant, means having spaced grips for each of the hands normally positioned on said head rest, means arranged and positioned to allow said hand grips to be drawn downward from said head rest, stirrups for each of the feet of the occupant of said seat, and means actuated by the downward movement of said hand grips to draw said stirrups into positions over each of said foot rests.

2. An ejection seat as recited in claim 1 in which said stirrups are attached to a spring and there is provided means for maintaining said spring under tension, said means being releasable by said means which allow said hand grips to be drawn downward from said head rest.

3. An ejection seat as recited in claim 1 in which each of said foot rests is provided with a U-shaped guide channel arranged and positioned to direct each of said feet into its respective foot rest.

4. An ejection seat as recited in claim 1 in which each of said stirrups is provided with a flexible connection to a spring-actuated means for drawing each stirrup into position over its respective foot rest.

5. An ejection seat as recited in claim 1 in which said hand grips are fixed at spaced positions on a rod, said rod being connected by flexible connection to said means for actuating said stirrups to draw them into positions over said foot rests.

6. An ejection seat as recited in claim 1 in which each of said stirrups is provided with a flexible member adapted to pass over and encircle the instep of each foot of the occupant of said seat.

7. In an ejection seat for launching a person from an aircraft, the combination of, a seat having a head rest and a foot rest for each foot of the occupant of said seat, a rod normally positioned on said head rest and having spaced hand grips thereon, a stirrup for each foot of said occupant, a flexible connection connecting each of said stirrups to separate springs, means for maintaining said springs under tension including a spring-loaded catch, for each of said springs, a flexible connection from each end of said rod to each of said spring loaded catches, said connections permitting said rod to be drawn downwardly whereby said spring-loaded catches are released thereby causing said springs to draw said stirrups into positions over said foot rests.

JAMES MARTIN.

REFERENCES CITED

The following references are of record in the file of this patent:

UNITED STATES PATENTS

| Number | Name | Date |
|---|---|---|
| 2,331,309 | Curriston | Oct. 12, 1943 |

FOREIGN PATENTS

| Number | Country | Date |
|---|---|---|
| 638,356 | France | Feb. 20, 1928 |